(12) United States Patent
Funke et al.

(10) Patent No.: US 8,342,450 B2
(45) Date of Patent: Jan. 1, 2013

(54) SEATING ARRANGEMENT OF A VEHICLE COMPARTMENT

(75) Inventors: Thomas Funke, Herford (DE); Manfred Junker, Bunde (DE)

(73) Assignee: Airbus Operations GmbH, Hamburg (DE)

( * ) Notice: Subject to any disclaimer, the term of this patent is extended or adjusted under 35 U.S.C. 154(b) by 629 days.

(21) Appl. No.: 12/312,331

(22) PCT Filed: Nov. 6, 2007

(86) PCT No.: PCT/EP2007/061919
§ 371 (c)(1),
(2), (4) Date: Oct. 22, 2009

(87) PCT Pub. No.: WO2008/055892
PCT Pub. Date: May 15, 2008

(65) Prior Publication Data
US 2010/0187357 A1    Jul. 29, 2010

(30) Foreign Application Priority Data
Nov. 6, 2006   (DE) .......................... 10 2006 052 536

(51) Int. Cl.
*B64D 13/00*   (2006.01)
(52) U.S. Cl. ..................................... 244/118.6
(58) Field of Classification Search ............. 244/117 R, 244/118.1, 118.5, 118.6, 121 R, 129.1; 297/67, 297/118, 184.14, 354.13, 232, 234, 237, 297/112, 114, 283.2, 1, 158, 245
See application file for complete search history.

(56) References Cited

U.S. PATENT DOCUMENTS

| 2,899,167 A | | 8/1959 | Elsner |
| 3,394,964 A | | 7/1968 | Humphries et al. |
| 3,528,096 A | * | 9/1970 | Moberg .................. 297/130 |

(Continued)

FOREIGN PATENT DOCUMENTS

DE        100 32 996       1/2002
(Continued)

OTHER PUBLICATIONS

International Preliminary Report on Patentability dated Jun. 18, 2009 for PCT/EP/2007/061919.
International Search Report for PCT/EP2007/061919, mailed Dec. 14, 2007.

*Primary Examiner* — Richard Price, Jr.
(74) *Attorney, Agent, or Firm* — Perman & Green, LLP (57) ABSTRACT

A seating arrangement in a vehicle compartment and particularly in an airplane cabin, includes a cabin floor with a carrier structure underneath, with at least two passenger seats, which are separated from each other by a gap. The seats include a table device in front of each seat, including a table top that can be folded down, wherein each seat includes a seat frame, which is connected to the carrier structure beneath the cabin floor of the airplane cabin, a seat cushion that is connected to the seat frame, and a backrest that is connected to the seat frame. In order to allow for a flexible and generous distribution of the seats in the cabin for the travel time and a pleasant ambiance for eating a meal together, the table device includes a table base, which is connected to the carrier structure beneath the cabin floor and is arranged such that it is generally located at the same distance from the seats of a group of seats and the table top of the table device is in front of both seats when folded down.

11 Claims, 8 Drawing Sheets

U.S. PATENT DOCUMENTS

| | | | |
|---|---|---|---|
| 3,583,760 A | 6/1971 | McGregor | |
| 5,328,231 A * | 7/1994 | Raymond | 297/13 |
| 5,947,416 A * | 9/1999 | Kraft | 244/118.5 |
| 5,957,529 A * | 9/1999 | Schrewe | 297/232 |
| 6,302,483 B1 | 10/2001 | Ricaud et al. | |
| 7,399,031 B2 * | 7/2008 | Gardner | 297/118 |
| 7,419,214 B2 * | 9/2008 | Plant | 297/245 |
| 7,607,612 B2 * | 10/2009 | Baatz et al. | 244/118.6 |
| 7,896,432 B2 * | 3/2011 | Dunkel | 297/124 |
| 8,096,502 B2 * | 1/2012 | Bock et al. | 244/118.6 |
| 2005/0087650 A1 | 4/2005 | Quan et al. | |

FOREIGN PATENT DOCUMENTS

| | | |
|---|---|---|
| EP | 0 850 834 | 7/1998 |
| EP | 0 747 256 | 1/2000 |
| FR | 2 882 006 | 8/2006 |
| GB | 2 362 095 | 11/2001 |
| WO | WO 99/56585 | 11/1999 |
| WO | WO 2004/026688 | 4/2004 |

* cited by examiner

SEATING ARRANGEMENT OF A VEHICLE COMPARTMENT

This application is the U.S. national stage of International Application No. PCT/EP2007/061919 filed 6 Nov. 2007, which designated the U.S. and claims priority to Germany Application No. 10 2006 052 536.1 filed 6 Nov. 2006, the entire contents of each of which are hereby incorporated by reference.

The disclosed embodiment relates to seating for a vehicle cabin and more particularly an aircraft cabin according to the preamble of claim 1.

BACKGROUND

Since people are travelling increasingly greater distances on airlines and the flights are lasting longer and longer without using an intermediate stop the provision of comfort on these journeys is becoming more and more important. More particularly the demand is thereby rising for seating of a high-quality standard which also makes it possible to offer passengers excellent catering at their seat. These demands are not met by the seating in cabins which is known up until now. Thus in present day aircraft layouts passengers are restricted in their freedom of movement and particularly in the freedom of their arms since for capacity reasons the seats are arranged relatively close together both side by side and one behind the other From EP 0 850 834 a fully adjustable reclining seat is known which can be moved and/or turned from a day position into a night time position. In the night time position the seat can be fully extended into the unused gangway. In the fully extended position the backrest can be brought into a horizontal position and the leg rest can be completely extended in order to allow the passengers a more peaceful sleep in the horizontal position.

In US 2005/087650 a cabin seat arrangement is described which has front and back seats and is intended for aircraft. The backrests and seat cushions can thereby be folded and moved inside a frame so that together with the opposing cushions they form a flat sleeping place for passengers.

In EP 0 825 108 a seat system is described for aircraft passengers wherein a seating group has a frame for anchoring in the floor as well as armrest elements and backrest and seat cushions which are movable relative to the frame so that four sitting positions and a folded position with three sitting positions can be set.

From EP 1 211 176 a passenger cabin is known in which the passenger seats are formed as individual seats on the outside wall whereby during takeoff and landing they are aligned forwards in a substantially longitudinal direction of the aircraft whilst during the flight phase they can be arranged in a position turned inwards in the direction of the centre axis of the cabin.

Particularly in the catering area of an aircraft the hitherto serving and attending to the passengers has up until now proceeded within very narrow limits, namely during the flight the alignment of the seats for the passengers remains fixedly preset in one direction.

Conversation with seat neighbours is possible only very restrictedly, and thus there is also no ambience allowed in which passengers have a sense of well being.

SUMMARY

It is the object of the disclosed embodiment to provide seating for high-class aircraft cabins which overcomes the said drawbacks of the prior art and which permits a flexible and generously-sized division of the seats in the cabin for the actual journey time and an acceptable ambience for shared dining.

This is achieved through the seating according to claim 1. Preferred aspects of the disclosed embodiment form the subject of the dependent claims The idea on which the disclosed embodiment is based consists in arranging the individual seats at a certain distance from one another wherein this distance corresponds roughly in particular to a seat width. Furthermore a folding table unit is mounted in front of each two adjacent seats which in the unfolded state offers table space for at least two seats. In particular aspects of the disclosed embodiment the seats and the table units are each able to rotate about a vertical axis, and seating groups can be formed having two or four individual seats and one common table.

The seating according to the disclosed embodiment for a vehicle cabin and more particularly an aircraft cabin which has a cabin floor with a support structure underneath, with:
- at least two seats for passengers which are separated from one another by an intermediate space, and
- each one table unit in front of each of the seats which comprises an unfolding table top,
- wherein each seat comprises:
  - a seat frame which is fixed on the support structure underneath the cabin floor of the aircraft cabin,
  - a seat cushion which is fixed on the seat frame,
  - a backrest which is fixed on the seat frame, wherein
- the table unit comprises a table pedestal socket which is fixed on the support structure underneath the cabin floor and is arranged so that it has substantially the same distance from each two seats of one seating group.

In a preferred embodiment the seating according to the disclosed embodiment has as a single feature—or insofar as technically possible and expedient—as combined features, that:
- the seat frame of each seat is capable of rotation about an in particular central vertical axis so that the seat can be turned in particular about 90.degree. or 180.degree.;
- the seat or the at least two seats of one seating group is or are displaceable sideways and/or forwards and backwards;
- the table pedestal socket is capable of rotation about an in particular central vertical axis;
- the table pedestal socket is capable of displacement sideways and/or forwards and backwards;
- the table pedestal socket is off-set forwards relative to the at least two seats of one seating group so that the lateral spacing of the two seats from one another is substantially one and a half times as big as the distance of the table pedestal socket from one of the seats;
- one seating group comprises four seats which are separated from one another by a first intermediate spacing sideways and a second intermediate spacing in the viewing direction, and the table pedestal socket is arranged symmetrically between the four seats so that its distance from each of the seats is substantially the same size;
- the table pedestal socket comprises a table top on each of the two opposite sides;
- the table top comprises several plate segments which are each connected to one another for articulated movement;
- the distance between two seats corresponds substantially to one seat width.

One of several advantages of the seating according to the disclosed embodiment lies in the fact that travel groups of up to four persons can travel together and dine together. However two or three persons can also be combined into one group, and the composition of one travel group can change during the course of the journey, for which only one or more seats have to be turned round towards the corresponding tables.

Further advantages and features of the disclosed embodiment are apparent from the following description of preferred embodiments in which reference is made to the accompanying drawings.

The drawings are not true to scale. The same or similar acting elements are provided with the same reference numerals. By seating is meant in this application the entire internal fittings of a vehicle cabin for passengers, i.e. the seats and the tables as well as the relevant associated components and fittings. The essential aspect of the following description is thereby the arrangement of the individual seats in the cabin.

DETAILED DESCRIPTION

Figure 1:
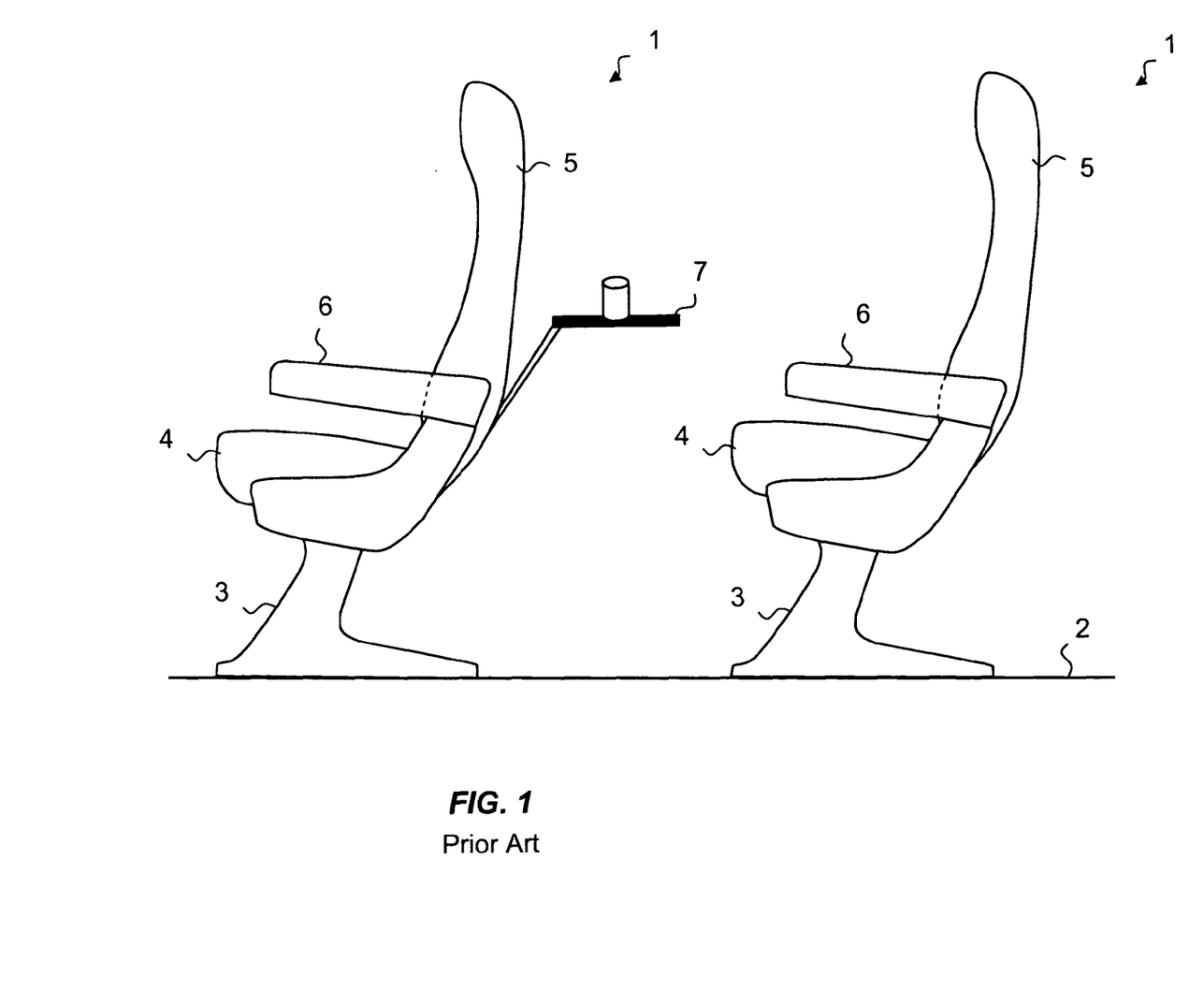
FIG. 1 shows in a side view a seat arrangement according to the prior art.

FIG. 1 shows in side view a typical arrangement of seats for passengers in an aircraft, of which two seats 1 are illustrated. The seats 1 are anchored on the floor 2 of the cabin so that they cannot slip, more particularly cannot slip during the high accelerations arising during take-off and landing of the aircraft. The seats 1 each comprise a seat frame 3 which is fixed on the floor 2, as well as a seat cushion 4 with backrest 5 and armrests 6 wherein the two rests are fixed either directly or indirectly on the frame 3. The seats are thereby as a rule not fixed on the floor 2 itself but on a support structure lying underneath the cabin floor 2.

Several seats 1 are brought together into rows (not shown) and several rows are arranged one behind the other. Whilst the seats of the same row can be arranged directly next to one another the rows have a distance from one another which enables the passengers to get into and out of their seat places from the aisle (not shown). Furthermore through the adequate distance between the rows it is possible to provide a small foldaway table 7 on which meals can be served or which serves as a shelf or tray for personal items of the passenger, such as indicated in FIG. 1 by a drinking vessel by way of example. This foldaway table 7 is in the case of present-day aircraft passenger seats a table top which is fixed by a frame on the seat in front of the respective passenger. When necessary the foldaway table 7 is unfolded and when it is no longer required it can be stowed away again in the back part of the seat in front.

In the next generation "premium class" for airline passengers the seats have more space so that a certain distance found to be more acceptable between the individual seat neighbours can also be provided. However the distance from the relevant seat in front is also to be increased so that getting in and out of the seat can be undertaken without effort and is possible without disturbing the seat neighbour. The increased distance from the seat in front makes it impractical however to integrate a foldaway table of the known type into the seat in front since this would have to be provided with over-proportionally extending arms and would thus be difficult to handle.

Figure 2A:
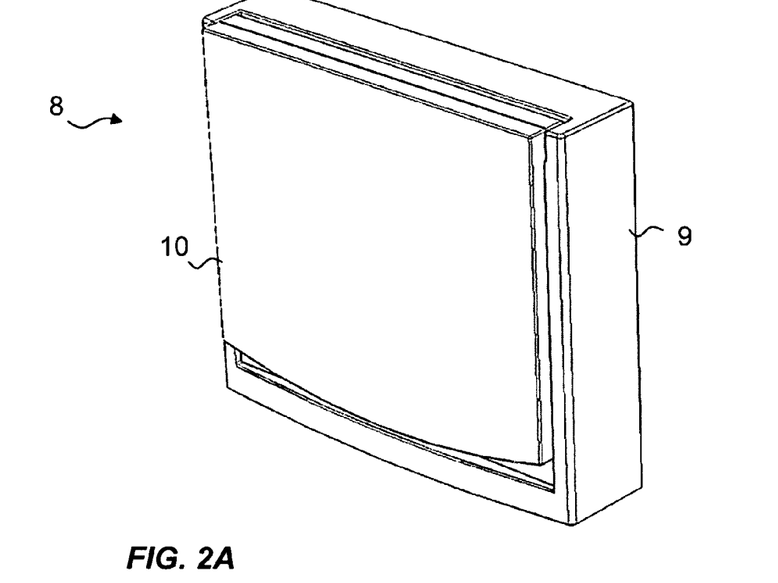
FIGS. 2A to 2D show in side and perspective views a table unit according to the disclosed embodiment in the folded-away and unfolded positions with one and two table tops respectively.

According to the disclosed embodiment therefore an autonomous table is proposed which can be arranged independently of a seat freely in the passenger cell, more particularly in the flight passenger cabin provided this is compatible with the support structure which is located underneath the cabin floor 2. A first embodiment of such a table module 8 is shown in FIG. 2. In FIG. 2A this first embodiment of the table module 8 is shown perspectively in the folded-away position. The table unit 8 comprises a table pedestal socket 9 and a fold-out table top 10. In the illustrated folded-away position the table top 10 is completely housed in the pedestal socket 9 so that it has no more protruding elements and thus represents no danger to persons passing by. Furthermore when folded away the table unit 8 is scarcely visible and thus fits well into the overall fittings of the cabin.

Figure 2B:
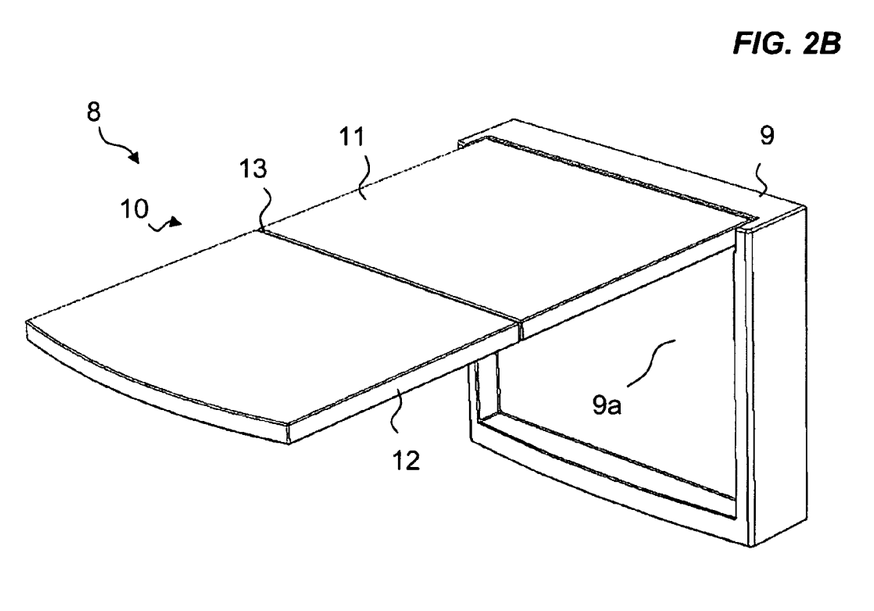

FIG. 2B shows the table unit 8 when it has been unfolded. Here the table top 10 is brought into the horizontal position so that it can serve as a tray surface for meals, drinks or even articles of any kind. In the illustrated embodiment the table top 10 consists of two segments, namely a first table top segment 11 and a second table top segment 12 wherein the first table top segment 11 fits directly on the pedestal socket 9 of the table unit 8. The second table top segment 12 is connected to the first table top segment 11 for articulated movement by means of an intermediate joint 13. Thus on the one hand this produces a satisfactory length for the table top 10 and on the other hand it is ensured that when folded away the table top can be completely taken in by the pedestal socket 9. For this the pedestal socket 9 has a correspondingly deep storage compartment 9a in which the table top 10 can be stowed. Determining the depth of the compartment 9a, the manner of locking the table top against accidental opening and the design of the intermediate joint 13 are well known to the person skilled in this field and will therefore not be explained in further detail.

It is self-evident that where necessary only one segment 11 is unfolded whilst the other segment 12 is folded in, i.e. remains underneath the first segment 11.

Figure 2C:
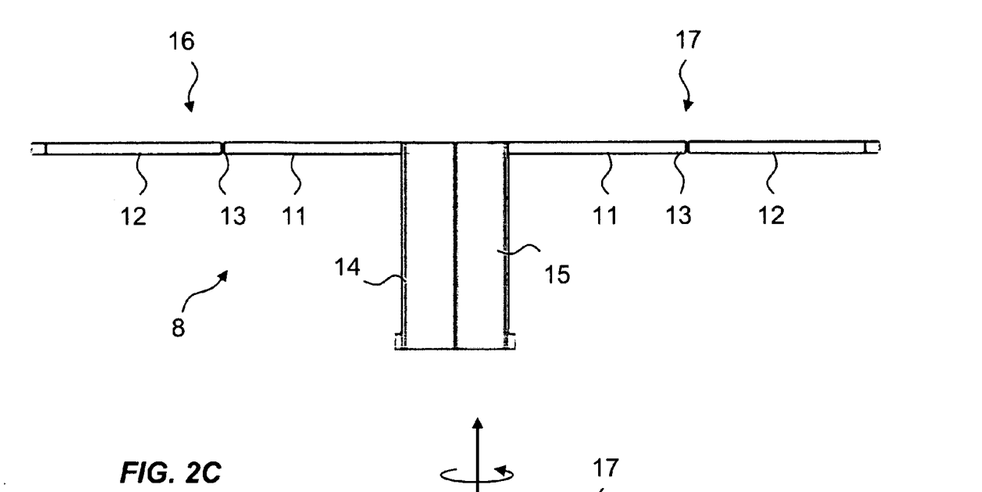
Figure 2D:
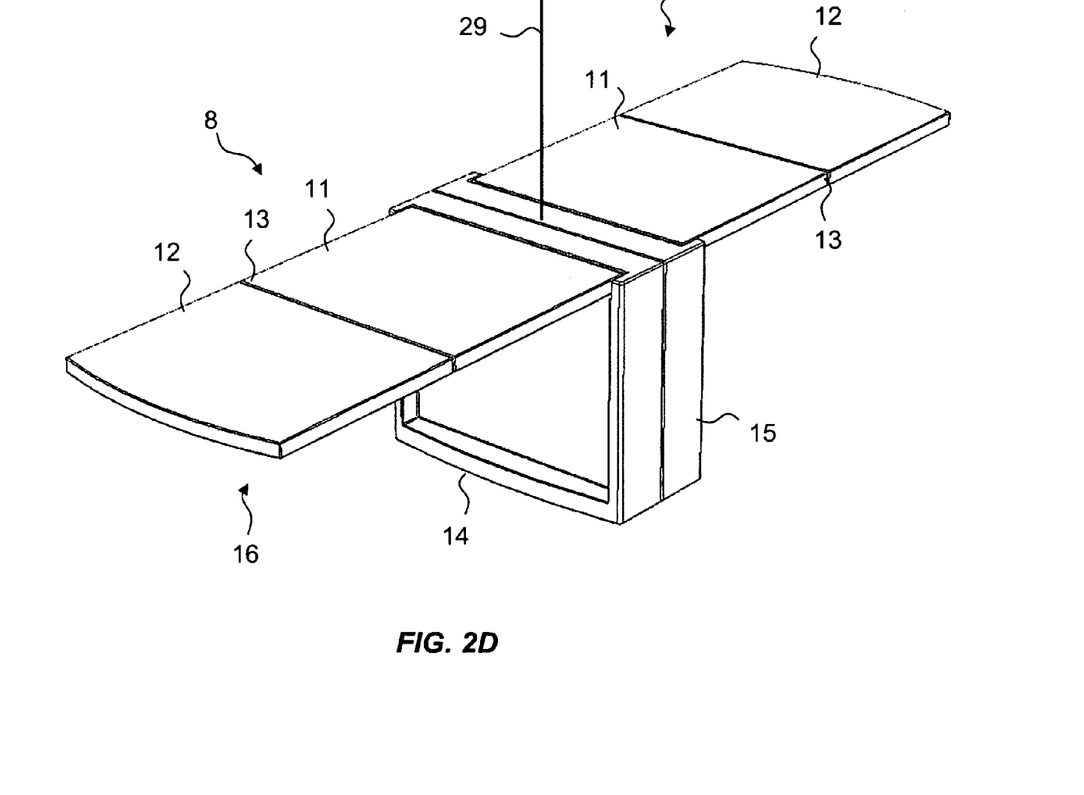

Whereas the embodiment of the table unit 8 according to FIGS. 2A and 2B only has a table top on one side, in FIGS. 2C and 2D an embodiment of the table is shown wherein the table pedestal socket is divided into two and has a first table pedestal socket 14 and a second table pedestal socket 15 which each only house one table top each. As can be seen from the side view in FIG. 2C, with this embodiment the table unit 8 comprises one table top 16 and 17 on each of its two opposite sides. The first table top 16 is attached to the first table pedestal socket 14 and similar to the embodiment according to FIG. 1A comprises a first table top segment 11 directly adjoining the pedestal socket 14 and a second table top segment 12 adjoining the first table top segment 11 wherein the connection is undertaken through an intermediate joint 13. In the same way the second table top 17 is attached to the second table pedestal socket 15 and likewise comprises a first table top segment 11 directly adjoining the pedestal socket 15 and a second table top segment 12 adjoining the first table top segment 11 wherein the connection is undertaken through an intermediate joint 13. For better illustration this embodiment is shown again in perspective in FIG. 2D, likewise in the unfolded position. In FIG. 2D it is furthermore indicated by a vertical axis 29 that the table is capable of rotating about this vertical axis 29. The advantages of this possibility will become clear further on in connection with FIG. 4. The axis 29 preferably runs down the middle, i.e. centrally through the table unit 8 so that during rotation around this axis it does not automatically also lead to (undesired) translation and thus the distance of the table from the surrounding seats changes during a rotation.

Figure 3:
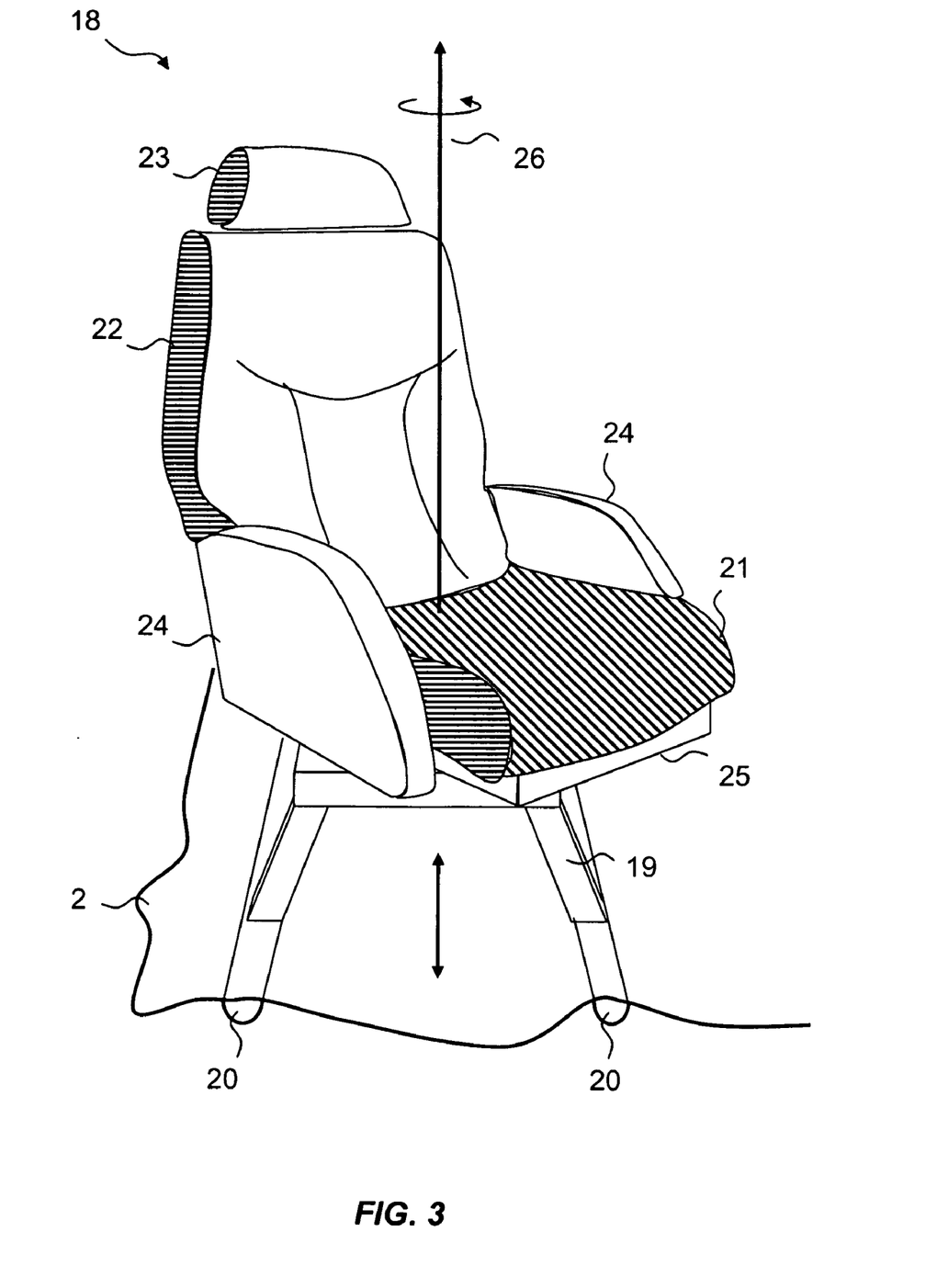
FIG. 3 shows a swivel seat according to the disclosed embodiment in perspective view.

FIG. 3 shows a swivel seat 18 for the seating according to the disclosed embodiment in a passenger cabin. The swivel seat 18 has a seat anchor 19 with which the swivel seat 18 is screwed in rails 20 underneath the floor 2 of the cabin. The swivel seat 18 can thereby be moved forwards and backwards in the rails 20, as is indicated by the double arrow. It is furthermore possible to slide the seat 18 in a lateral direction if the seat anchor 19 per se has a corresponding adjustment feature (not shown). The swivel seat 18 comprises moreover components which are analogous to those of the seat according to the prior art in FIG. 1. These components are a seat surface 21, a seat back 22, which is connected indirectly or directly to the seat surface 21, as well as a neck rest 23 at the upper end of the seat back 22. Furthermore side rests 24 are provided in which in particular control elements (not shown) for seat adjustment and also entertainment program controls can be integrated.

The actual seat components 21, 22, 23 and 24 are mounted on a turntable 25 which is fixed rotatable on the seat anchor 19. The seat 18 illustrated in FIG. 3 thus differs from the seat 1 in FIG. 1 in that it is capable of rotation—analogous with the table unit 8—so that it can be turned round in particular 90.degree. or 180.degree. The passenger can thus face his seat neighbour or even the passenger seated behind him. With the "sliding carousel understructure" 19, 25 described above it is moreover possible to change the distance between the seats, and thus in the case of the seat 18 maximum flexibility is reached with the displacement possibilities. This is particularly of advantage in the case of seat configurations which will be explained below with reference to FIGS. 4A to 4D. The vertical axis about which the seat 18 can be turned is marked 26 in FIG. 3. This axis is preferably located in the centre of the seat so that during rotation about the axis 26 one does not experience at the same time any translation where during rotation the distance of the seated passenger from his seat neighbour or from the table in front of him would change.

Figure 4A:
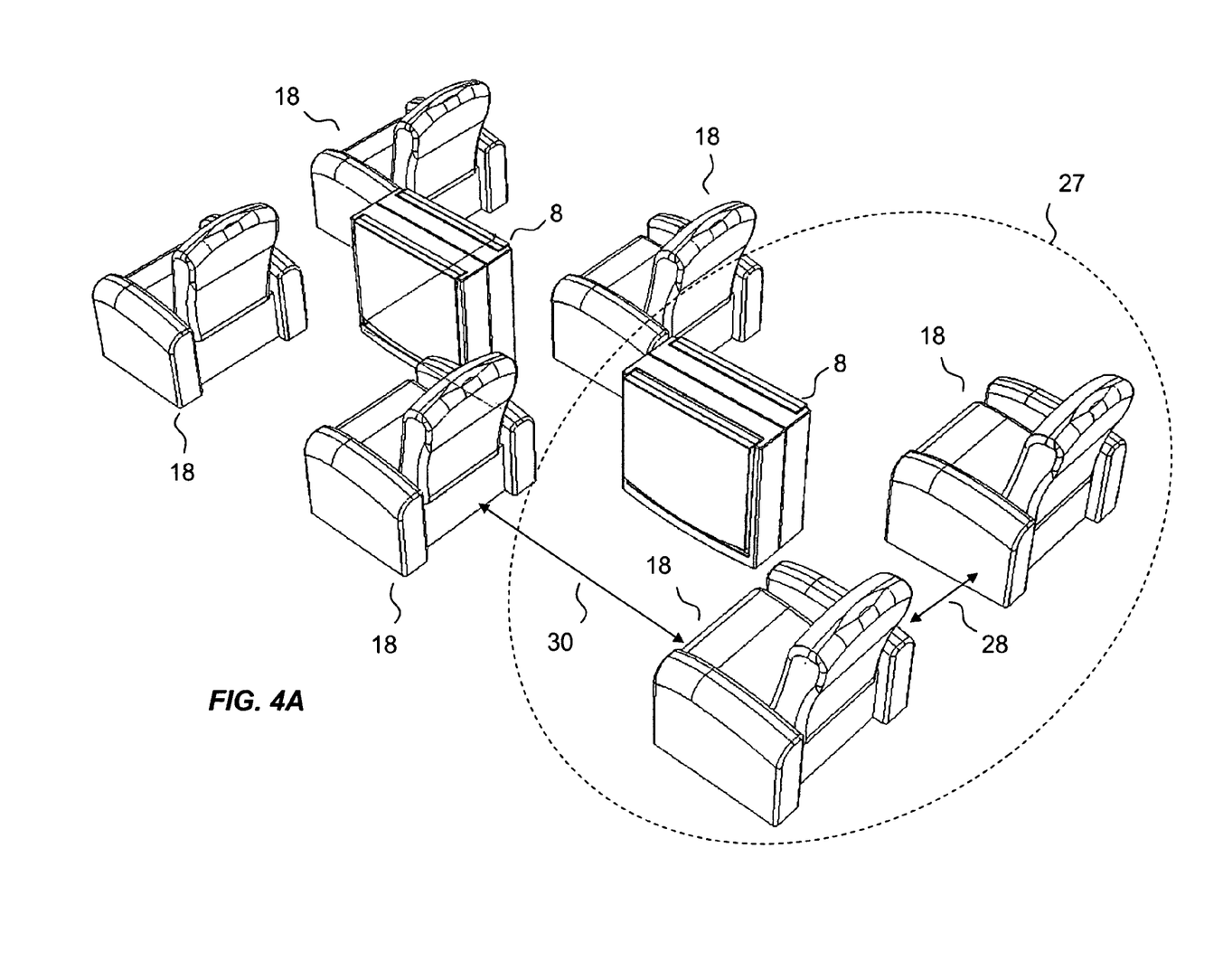
FIGS. 4A to 4D show the seating according to the disclosed embodiment of the vehicle cabin in different configurations.

With the table 8 according to FIG. 2 and a seat 18 according to FIG. 3 the seat and table configurations explained below with reference to FIG. 4 can be implemented in a "premium class" for passengers or in passenger operations for first class or "business class". FIG. 4A shows a first configuration in which all seats 18 in the cabin are orientated in one and the same direction. This is particularly the case during the take-off or landing phase of an aircraft. The table units are then located in their folded-away position and in an orientation in which they cause no obstruction, whether in the case of a crash or during evacuation of the cabin. In the illustrated configuration each two seats 18 for the passengers and one table unit 8 are grouped as one seating group 27. The seating group 27 is indicated by a dotted outline. The actual assignment of seats and tables into one seating group 27 can in practice be made in dependence on the actual relationship of the passengers to one another. The assignment assumed below is thus purely random. The seats 18 are separated from one another by a lateral interspace 28 whereby the table unit 8 is located in front of the seats so that it has roughly the same distance from each of the two seats. In the viewing direction, thus facing the front, they are separated from one another by a distance 30 which is clearly more generously sized than the distance between two seats 1 arranged one behind the other in the case of the prior art according to FIG. 1. The two said distances 28, 30 are indicated by double arrows, and they preferably each correspond to the width and length respectively of one seat.

The table pedestal socket 9 is set forwards in relation to the seats 18 so that the lateral distance 28 of the two seats 18 from one another is preferably substantially one and a half times as large as the distance of the table pedestal socket from one of the seats. Thus four surrounding seats can be served from one table wherein the distance of the table from all of the seats is the same.

Figure 4B:
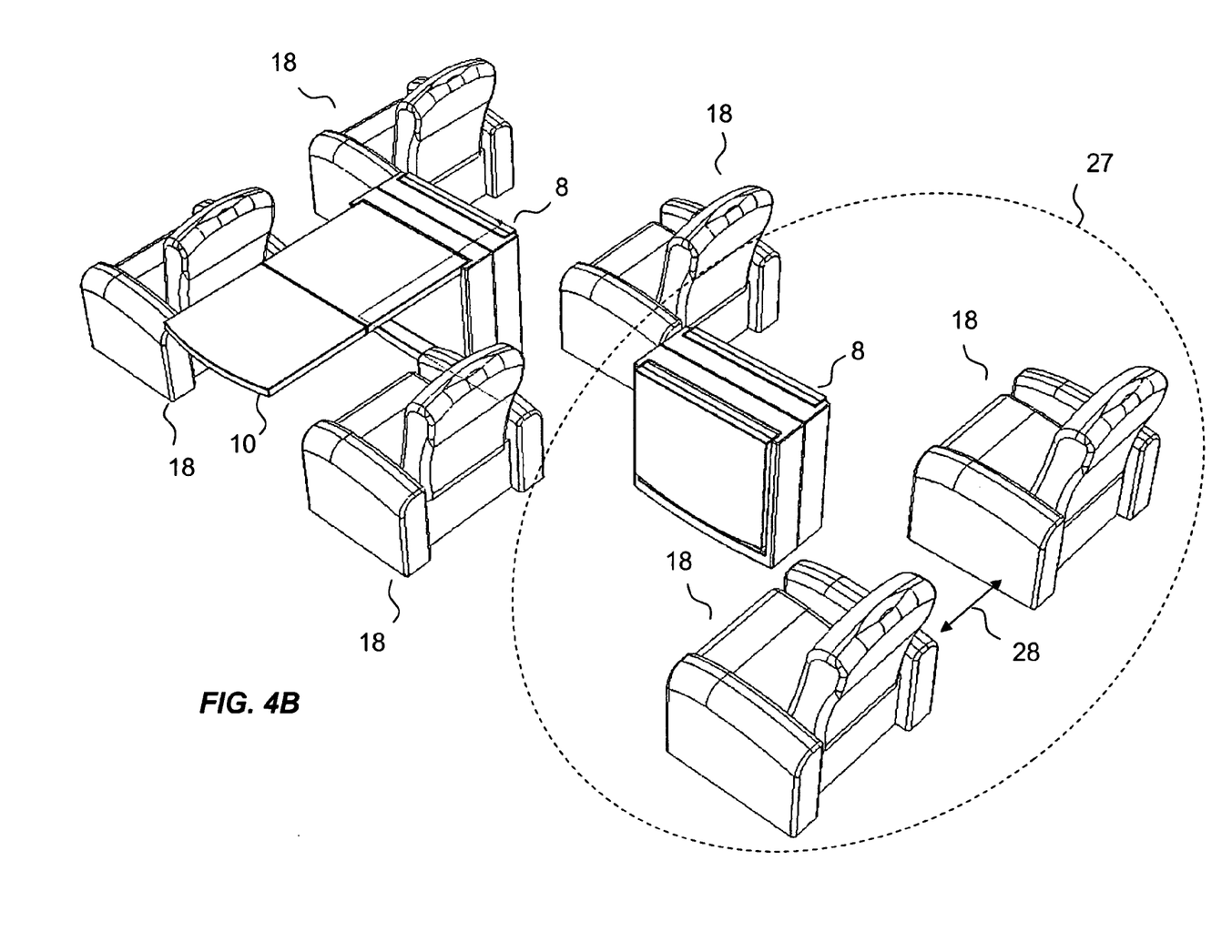

When unfolded out each one table top 10 is thereby then located in front of one of the seats 18. This is shown in a first constellation in FIG. 4B. In FIG. 4B in the case of the table unit 8 on the left at the top, i.e. the front most table unit 8 one side of the table 8 is unfolded. The passenger in the second seat on the left thus has the possibility of placing articles or meals in front of him. The other table tops are in this configuration folded in and away as before so that the passengers on the other seats shown have maximum leg space and freedom of movement.

Figure 4C:
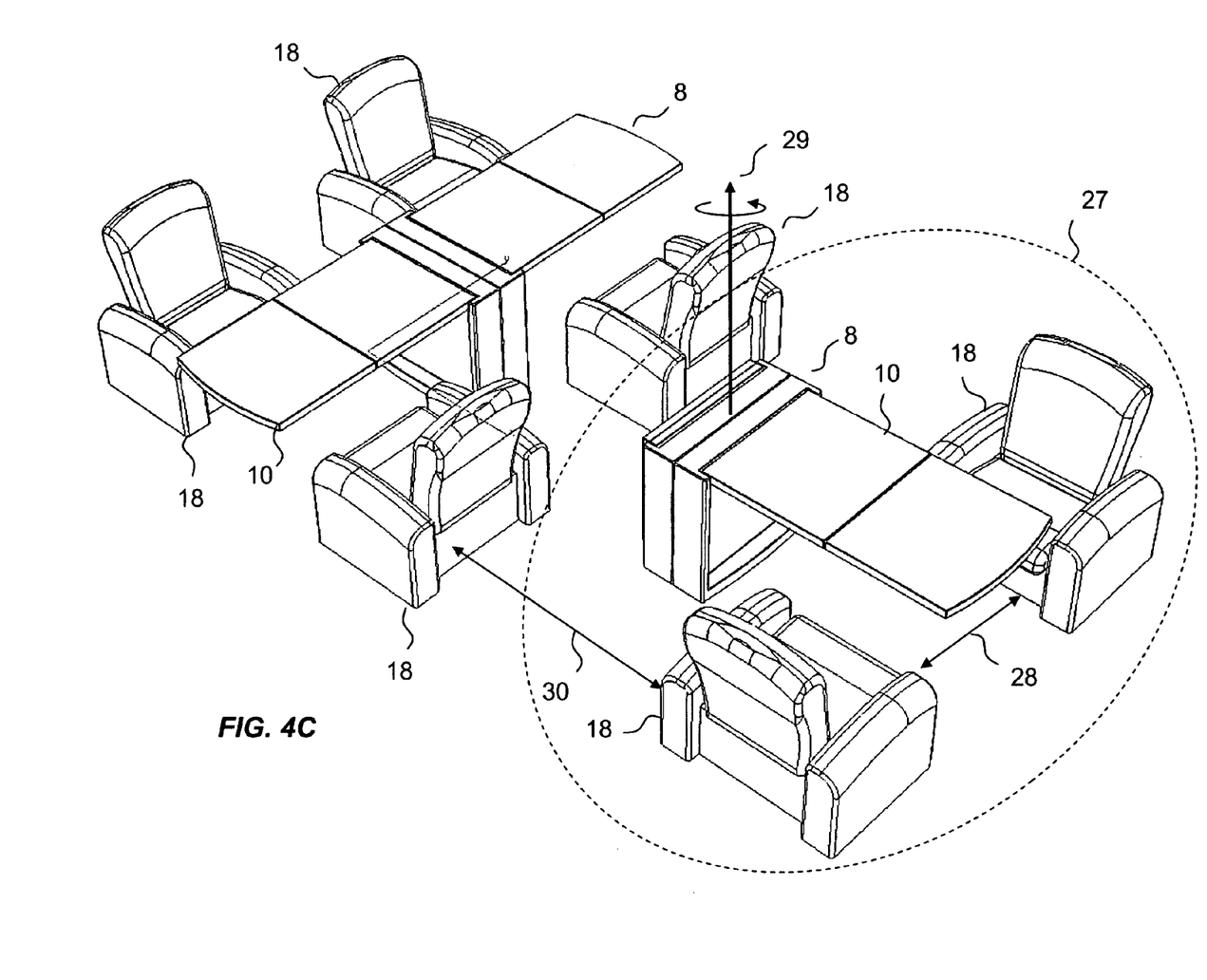

In the configuration according to FIG. 4C the two seats at the front are turned around 180.degree. so that they look "backwards". Between them and the seats behind the table unit 8 is unfolded out completely so that the two front turned seats and the two rear seats are each located in front of a table top 10. Thus four persons can be served with one table module 8 according to the idisclosed embodiment. They can furthermore form their own one seating group which remains in the same constellation throughout the entire duration of the journey.—The two seats 18 in the seating group 27 behind are each turned round 90.degree. relative to one another so that their occupants now sit facing one another. One table is likewise to be set up between them. For this the corresponding table module 8 is first turned 90.degree. about its vertical axis 29 from its original position shown in FIGS. 4A and 4B into a new crosswise position, and then one of the two table tops 10 is unfolded out. The other table top 10 is not required and therefore remains folded away. The seating group 27 with two persons has thus also been converted into a dining constellation.

Figure 4D:
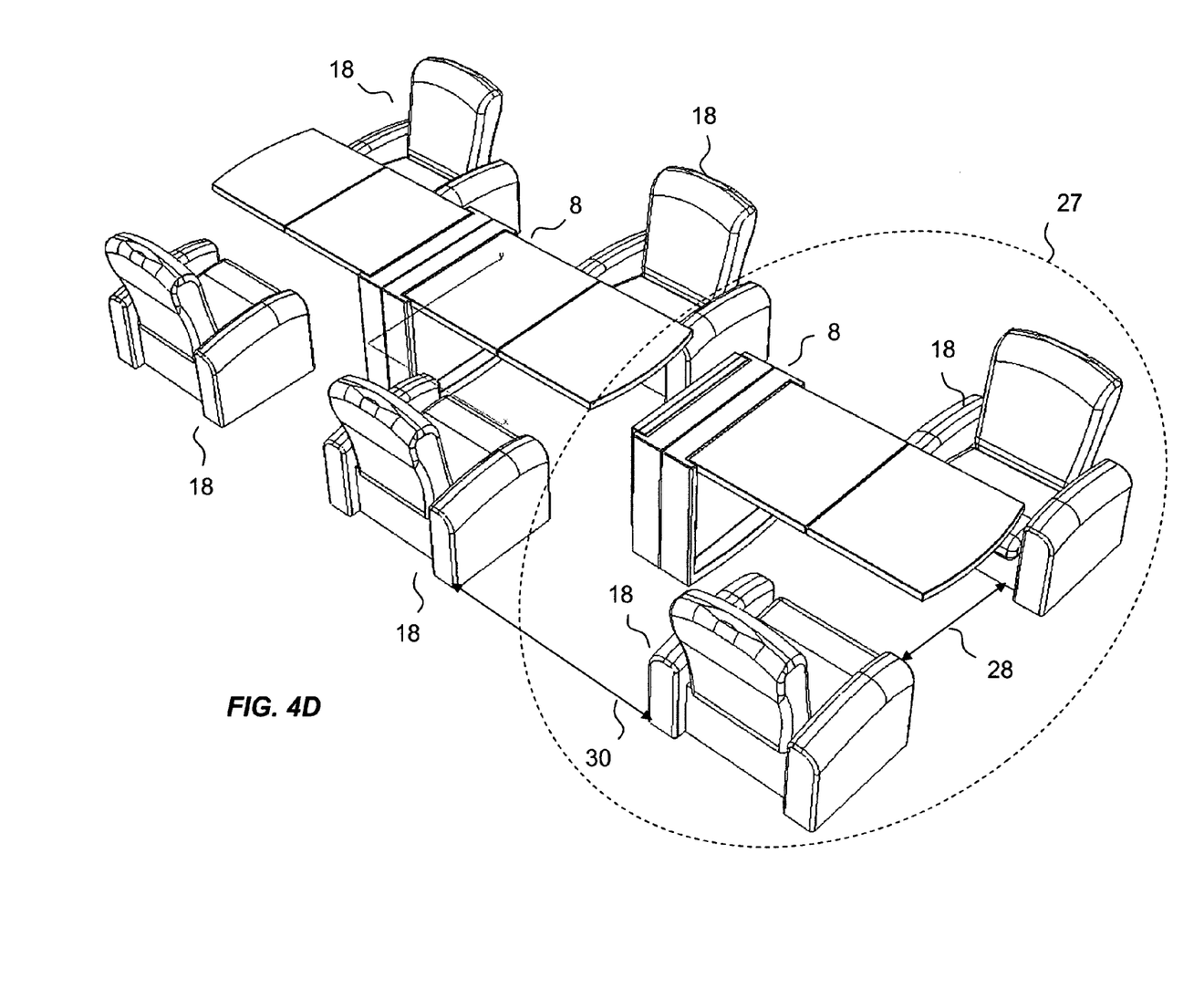

Finally in FIG. 4D a constellation is shown which represents an alternative to those in FIG. 4C. Here the seats 18 of the two first seat pairs at the front in the cabin are all turned round 90.degree. so that former seat neighbours now each sit facing one another. In this way a "board table" can also be produced, and the example shows the great flexibility in the constellation of the seating according to the disclosed embodiment.

Turning the table or seat is preferably carried out electrically, pneumatically or hydraulically. In order to be able to adjust the seats and tables nevertheless in the event of failure of the system a crank handle (not shown) is provided.

More particularly the tables close to the side walls are preferably designed asymmetric, i.e. have a fold-out table top only on one side. As a rule however the other tables have a table top on each of their two sides.

REFERENCE NUMERALS

1 Seat
2 Cabin floor
3 Seat frame
4 Seat cushion
5 Backrest
6 Armrest
7 Foldaway table
8 Table unit 9 Table pedestal socket, 9a storage compartment for folded-away table top
10 Unfolding table top
11 First table top segment
12 Second table top segment
13 Intermediate joint
14 First table pedestal socket
15 Second table pedestal socket
16 First unfolding table top
17 Second unfolding table top
18 Swivel seat
19 Seat anchor
20 Fixing rail
21 Seat surface
22 Seat back
23 Neck support
24 Side rest
25 Rotatable seat plate
26 Central vertical axis of seat
27 Seating group
28 Side interspace between adjoining seats
29 Central vertical axis of table pedestal socket
30 Frontal interspace between successive seats

The invention claimed is:

1. Seating for a vehicle cabin having a cabin floor with a support structure underneath, comprising:
several seats for passengers which are each separated from one another by an interspace, and
one table unit in front of each of the seats and comprising an unfolding table top,
wherein each seat comprises:
a seat frame which is fixed on the support structure underneath the cabin floor,
a seat cushion which is fixed on the seat frame,
a backrest which is fixed on the seat frame,
wherein the several seats are maintained a predetermined distance from one another,
wherein the seat frame of each seat is capable of rotating around a vertical axis so that the seats can be combined into variable seating groups, and
in the case of each seating group the table unit comprises a table pedestal socket which is fixed on the support structure underneath the cabin floor and is arranged so that the table top has substantially an equal distance from each of at least two seats of one seating group.

2. The seating according to claim 1 wherein the seat frame of each seat is capable of rotating around 90° or 180° about the vertical axis.

3. The seating according to claim 1 wherein each seat of one seating group is displaceable in any combination of sideways, forwards, and backwards.

4. The seating according to claim 1 wherein the table pedestal socket is capable of rotating around a central vertical axis.

5. The seating according to claim 1 wherein the table pedestal socket is displaceable in any combination of sideways, forwards, and backwards.

6. The seating according to claim 1 wherein the table pedestal socket is off-set forwards relative to at least two seats of a seating group comprising at least two seats, so that a lateral distance between the at least two seats is substantially one and halftimes as large as a distance to the table pedestal socket from one of the at least two seats.

7. The seating according to claim 1 wherein:
the seating group comprises four seats which are separated from one another sideways by a first interspace and in a viewing direction by a second interspace, and
the table pedestal socket is arranged symmetrically between the four seats so that a distance from the table pedestal to each of the seats is substantially the same.

8. The seating according to claim 7, wherein the unfolding table top comprises a table top on each of two opposite sides of the table pedestal socket.

9. The seating according to claim 1 wherein the table top has several plate segments which are each connected to one another with articulated movement.

10. The seating according to claim 1 wherein the predetermined distance between two seats corresponds substantially to one seat width.

11. The seating according to claim 1 wherein the seat frame of each seat is capable of rotating around 90° or 180° about a vertical axis.

* * * * *